(12) United States Patent
Ayoub et al.

(10) Patent No.: US 10,531,341 B1
(45) Date of Patent: Jan. 7, 2020

(54) ECALL PLUS TO ECALL ONLY TRANSITION AND RECOVERY PATH

(71) Applicant: FORD GLOBAL TECHNOLOGIES, LLC, Dearborn, MI (US)

(72) Inventors: Issam Ayoub, Royal Oak, MI (US); Said Abdallah, Canton, MI (US); Mojtaba Razfar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/101,800

(22) Filed: Aug. 13, 2018

(51) Int. Cl.
*H04W 4/22* (2009.01)
*H04W 36/00* (2009.01)
*H04W 68/00* (2009.01)
*H04W 76/18* (2018.01)
*H04W 36/32* (2009.01)
*H04W 60/02* (2009.01)

(52) U.S. Cl.
CPC ........ *H04W 36/0011* (2013.01); *H04W 36/32* (2013.01); *H04W 60/02* (2013.01); *H04W 68/005* (2013.01); *H04W 76/18* (2018.02)

(58) Field of Classification Search
None
See application file for complete search history.

(56) References Cited

U.S. PATENT DOCUMENTS

| 9,905,129 | B2 | 2/2018 | Colella et al. | |
|---|---|---|---|---|
| 2013/0023228 | A1* | 1/2013 | Watson | H04W 4/40 455/404.1 |
| 2017/0285712 | A1 | 10/2017 | Veloso et al. | |

* cited by examiner

*Primary Examiner* — Gary Lafontant
(74) *Attorney, Agent, or Firm* — Michael J. Spenner; Brooks Kushman P.C.

(57) ABSTRACT

Responsive to detecting transition from an eCall Plus mode to an eCall Only mode, and to acknowledgement from a service delivery network (SDN) of an alert of the transition sent to the SDN by a telematics controller, the telematics controller reattaches to a network in eCall Only mode. Responsive to transition from eCall Only mode to eCall Plus mode, the controller reattaches to the network in eCall Plus mode.

17 Claims, 7 Drawing Sheets

US 10,531,341 B1

ECALL PLUS TO ECALL ONLY TRANSITION AND RECOVERY PATH

TECHNICAL FIELD

Aspects of the disclosure generally relate to providing a dynamic mechanism to control the service mode of the Telematics Control Unit (TCU)/In vehicle embedded modem, to enable switching between an eCall Plus mode in which telematics, infotainment and emergency services are active, and an eCall Only mode in which emergency services are active.

BACKGROUND eCall is a service designed to provide quick response times to vehicles in case of a road incident. Responsive to detection of a road incident, the in-vehicle e-call system establishes a connection with a Public Safety Answering Point (PSAP) in the vicinity of the vehicle. Additionally, a Minimum Set of Data (MSD) is sent from the vehicle to the PSAP to automatically provide basic information about the incident to the PSAP. The MSD includes information such as a location of the vehicle, a vehicle identification number (VIN) of the vehicle, and a time of occurrence of the incident.

SUMMARY

In one or more illustrative examples, a vehicle includes a telematics controller, programmed to, responsive to detecting transition from an eCall Plus mode to an eCall Only mode, and to acknowledgement from a service delivery network (SDN) of an alert of the transition sent to the SDN by the controller, reattach to a network in eCall Only mode; and responsive to transition from eCall Only mode to eCall Plus mode, reattach to the network in eCall Plus mode.

In one or more illustrative examples, a method includes periodically identifying values of a subscriber identity module (SIM) of the telematics controller to identify a change of service mode; and responsive to a detected transition of the service mode from eCall Plus mode to eCall Only mode, and to acknowledgement from a service delivery network (SDN) of an alert of the transition sent to the SDN by the vehicle, reattaching the controller to a network in eCall Only mode.

In one or more illustrative examples, a non-transitory computer-readable medium comprising instructions that, when executed by a processor of a telematics controller of a vehicle, cause the controller to periodically identify values of a subscriber identity module (SIM) of the telematics controller to identify a change of service mode; responsive to a detected transition of the service mode from an eCall Plus mode to an eCall Only mode, and to acknowledgement from a service delivery network (SDN) of an alert of the transition sent to the SDN by the vehicle, reattach to a network in eCall Only mode; and responsive to a detected transition from eCall Only mode to eCall Plus mode, reattaching to the network in eCall Plus mode.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It may be desirable for a vehicle to offer telematics, infotainment, and emergency services in the same telematics control unit (TCU)/embedded modem. However, to do so raises challenges of allowing the coexistence of these services simultaneously, as well as with providing a capability to disable the telematics and infotainment services due to requests from customers with privacy concerns (e.g., customers who do not consent to share their location information), while keeping the emergency services active to meet the legal requirements in some markets (e.g., Europe). Therefore, a robust and user-friendly solution that controls the TCU's service mode may be required.

An improved telematics controller may be programmed to switch into and out of a mode in which nonemergency services are disabled, therefore stopping any communication between the customer's vehicle and the cellular network except for communications required for emergency calls. Additionally, the improved controller may be programmed to provide a recovery path to re-enable the telematics and infotainment services if required, overcoming the challenge that the TCU is not reachable over the air (OTA) at some point. Further aspects of the disclosure are discussed in detail below.

Figure 1:
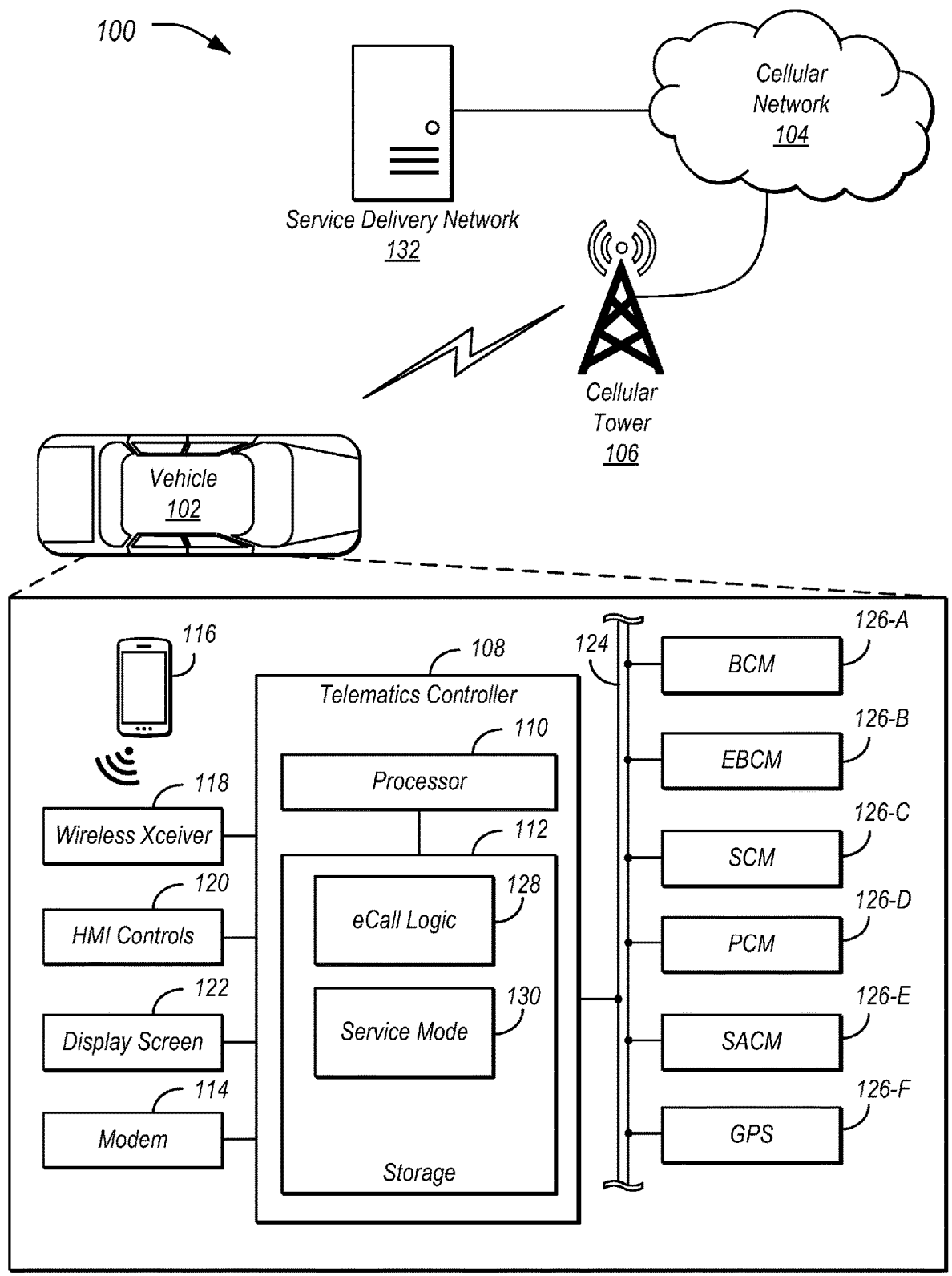
FIG. 1 illustrates an example system for performing "eCall Plus" to "eCall Only" transitioning and recovery.

FIG. 1 illustrates an example system 100 for performing "eCall Plus" to "eCall Only" transitioning and recovery. As shown, the system 100 includes a vehicle 102 in communication over a cellular network 104. The vehicle 102 is configured to wirelessly communicate with cellular towers 106 connected to the cellular network 104. Only one cellular tower 106 is shown for clarity, but it should be noted that systems 100 typically include many cellular towers 106 arranged to cover a large geographical area. While an example system 100 is shown in FIG. 1, the example components, as illustrated, are not intended to be limiting. Indeed, the system 100 may have more or fewer components, and additional or alternative components and/or implementations may be used. As an example, the system 100 may include more or fewer vehicles 102.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. Further aspects of the functionality of the vehicle 102 are discussed in detail with respect to FIG. 2.

By accessing the cellular network 104, the vehicle 102 may be able to send outgoing data from the vehicle 102 to network destinations on the cellular network 104, and receive incoming data to the vehicle 102 from network destinations on the cellular network 104.

The cellular towers 106 may include system hardware configured to allow cellular transceivers of the vehicles 102 to access the communications services of the cellular network 104. In an example, the cellular towers 106 may be part of a Global System for Mobile communication (GSM) cellular service provider. In another example, the cellular towers 106 may be part of a code division multiple access (CDMA) cellular service provider. The cellular towers 106 may support various different technologies and data speeds.

Figure 2:
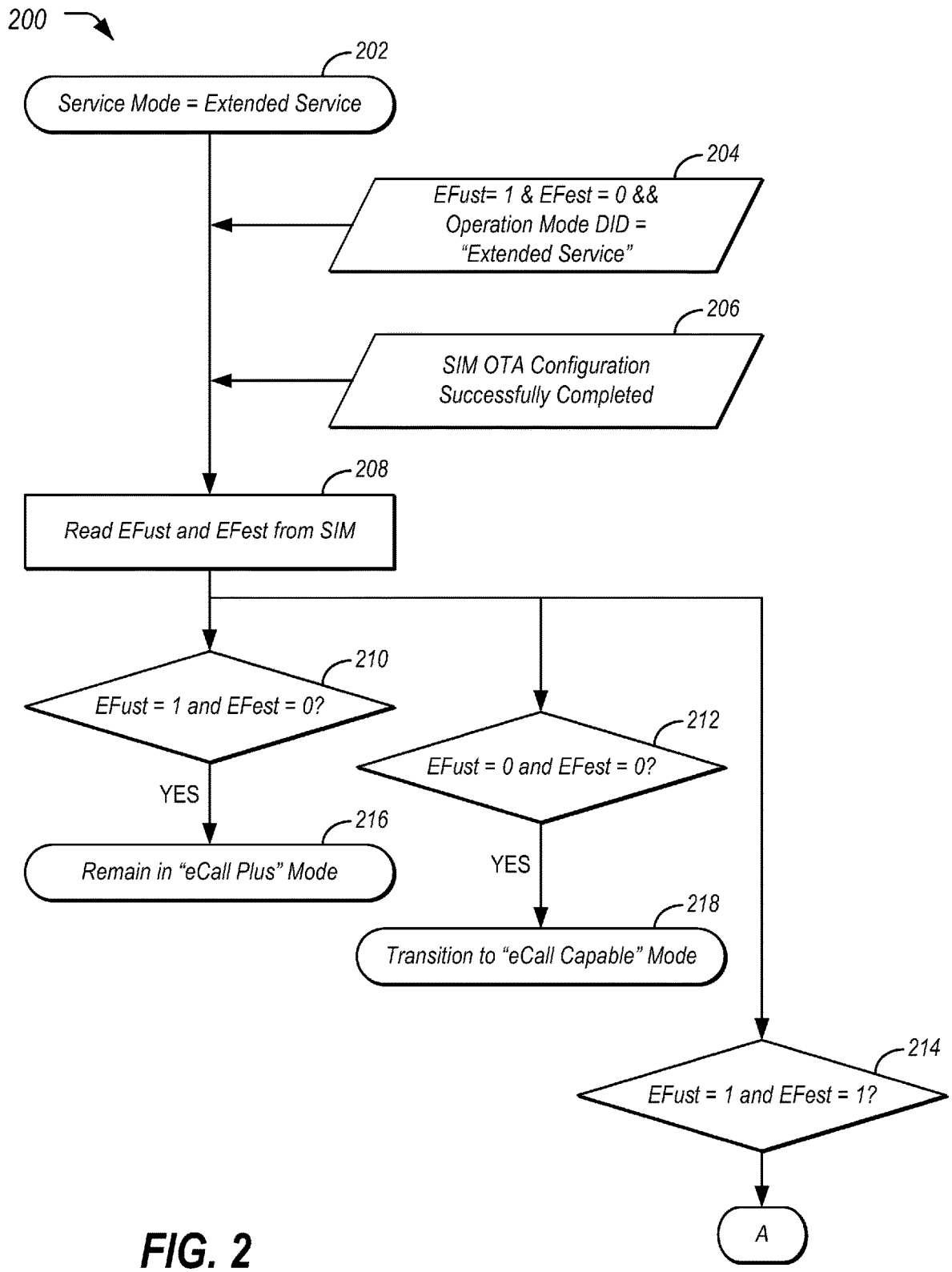
FIG. 2 illustrates an example portion of a process for performing "eCall Plus" to "eCall Only" transitioning and recovery.

The vehicle 102 includes a telematics controller 108 (sometimes referred to herein as a TCU) configured to communicate over the cellular network 104. This communication may be performed using a modem 114 of the telematics controller 108. While an example vehicle 102 is shown in FIG. 2, the example components as illustrated are not intended to be limiting. Indeed, the vehicle 102 may have more or fewer components, and additional or alternative components and/or implementations may be used.

The telematics controller 108 may be configured to support voice command and BLUETOOTH interfaces with the driver and driver carry-on devices (e.g., mobile devices 116), receive user input via various buttons or other controls, and provide vehicle status information to a driver or other vehicle 102 occupants. An example telematics controller 108 may be the SYNC system provided by FORD MOTOR COMPANY of Dearborn, Mich.

The telematics controller 108 may further include various types of computing apparatus in support of performance of the functions of the telematics controller 108 described herein. In an example, the telematics controller 108 may include one or more processors 110 configured to execute computer instructions, and a storage 112 medium on which the computer-executable instructions and/or data may be maintained. A computer-readable storage medium (also referred to as a processor-readable medium or storage 112) includes any non-transitory (e.g., tangible) medium that participates in providing data (e.g., instructions) that may be read by a computer (e.g., by the processor(s) 110). In general, a processor 110 receives instructions and/or data, e.g., from the storage 112, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The telematics controller 108 may be configured to communicate with mobile devices 116 of the vehicle occupants. The mobile devices 116 may be any of various types of portable computing device, such as cellular phones, tablet computers, smart watches, laptop computers, portable music players, or other devices capable of communication with the telematics controller 108. As with the telematics controller 108, the mobile devices 116 may include one or more processors configured to execute computer instructions, and a storage medium on which the computer-executable instructions and/or data may be maintained. In many examples, the telematics controller 108 may include a wireless transceiver 118 (e.g., a BLUETOOTH controller, a ZIGBEE transceiver, a Wi-Fi transceiver, etc.) configured to communicate with a compatible wireless transceiver of the mobile device 116. Additionally, or alternately, the telematics controller 108 may communicate with the mobile device 116 over a wired connection, such as via a USB connection between the mobile device 116 and a USB subsystem of the telematics controller 108.

The telematics controller 108 may also receive input from human-machine interface (HMI) controls 120 configured to provide for occupant interaction with the vehicle 102. For instance, the telematics controller 108 may interface with one or more buttons or other HMI controls 120 configured to invoke functions on the telematics controller 108 (e.g., steering wheel audio buttons, a push-to-talk button, instrument panel controls, etc.). The telematics controller 108 may also drive or otherwise communicate with one or more displays 122 configured to provide visual output to vehicle occupants, e.g., by way of a video controller. In some cases, the display 122 may be a touch screen further configured to receive user touch input via the video controller, while in other cases the display 122 may be a display only, without touch input capabilities. In an example, the display 122 may be a head unit display included in a center console area of the vehicle 102 cabin. In another example, the display 122 may be a screen of a gauge cluster of the vehicle 102.

The telematics controller 108 may be further configured to communicate with other components of the vehicle 102 via one or more in-vehicle networks 124. The in-vehicle networks 124 may include one or more of a vehicle controller area network (CAN), an Ethernet network, or a media oriented system transfer (MOST), as some examples. The in-vehicle networks 124 may allow the telematics controller 108 to communicate with other vehicle 102 systems, such as a body controller (BCM) 126-A, an electronic brake control system (EBCM) 126-B, a steering control system (SCM) 126-C, a powertrain control system (PCM) 126-D, a safety control system (SACM) 126-E, and a global positioning system (GPS) 126-F. As depicted, the controllers 126 are represented as discrete controllers and systems. However, the controllers 126 may share physical hardware, firmware, and/or software, such that the functionality from multiple controllers 126 may be integrated into a single controller 126, and that the functionality of various such controllers 126 may be distributed across a plurality of controllers 126.

The BCM 126-A may be configured to support various functions of the vehicle 102 related to control of current loads feeding off the vehicle 102 battery. Examples of such current loads include, but are not limited to, exterior lighting, interior lighting, heated seats, heated windshield, heated backlight, and heated mirrors. Additionally, the BCM 126-A may be configured to manage vehicle 102 access functions, such as keyless entry, remote start, and point of access status verification (e.g., closure status of the hood, doors and/or trunk of the vehicle 102).

The EBCM 126-B may be configured to control braking functions of the vehicle 102. In some examples, the EBCM 126-B may be configured to receive signal information from vehicle wheel sensors and/or drivetrain differentials, and manage anti-lock and anti-skid brake functions through control of brake line valves that adjust brake pressure from the master cylinder.

The SCM 126-C may be configured to aid in vehicle steering by augmenting or counter-acting steering effort provided to the vehicle 102 wheels. In some cases, the augmented steering effort may be provided by a hydraulic steering assist configured to provide controlled energy to the steering mechanism, while in other cases the augmented steering effort may be provided by an electric actuator system.

The PCM 126-D may be configured to perform engine control and transmission control functions for the vehicle 102. With respect to engine control, the PCM 126-D may be configured to receive throttle input and control actuators of the vehicle engine to set air/fuel mixture, ignition timing, idle speed, valve timing, and other engine parameters to ensure optimal engine performance and power generation. With respect to transmission control, the PCM 126-D may be configured to receive inputs from vehicle sensors such as wheel speed sensors, vehicle speed sensors, throttle position, transmission fluid temperature, and determine how and when to change gears in the vehicle 102 to ensure adequate performance, fuel economy, and shift quality. The PCM 126-D may further provide information over the in-vehicle networks 124, such as vehicle speed and engine RPM.

The SACM 126-E may be configured to provide various functions to improve the stability and control of the vehicle 102. As some examples, the SACM 126-E may be configured to monitor vehicle sensors (e.g., steering wheel angle sensors, yaw rate sensors, lateral acceleration sensors, wheel speed sensors, etc.), and control the BCM 126-A, SCM 126-C, and/or PCM 126-D. As some possibilities, the SACM 126-E may be configured to provide throttle input adjustments, steering angle adjustments, brake modulation, and all-wheel-drive power split decision-making over the in-vehicle networks 124 to improve vehicle stability and controllability. It should be noted that in some cases, the commands provided by the SACM 126-E may override other command input. The GPS 126-F is configured to provide vehicle 102 current location and heading information for use in vehicle 102 services.

The eCall Logic 128 may be an application, code, firmware, and/or electronic circuitry installed to the telematics controller 108 (e.g., in the storage 112). When executed by the processor 110, the eCall logic 128 may cause the telematics controller 108 to direct the modem 114 to perform the operations discussed in detail with respect to FIGS. 2-7.

The service mode 130 refers to the mode of operation of the TCU 108. For example, this mode may indicate an "eCall Plus" mode in which eCall and additional data services are to be provided via the TCU 108, or an "eCall Only" mode in which eCall service but no other services are provided. An indication of the current service mode 130 may be maintained in storage 112 of the telematics controller 108.

The service delivery network (SDN) 132 may be a cloud platform configured to provide cloud-based services to vehicles 102. These services may include, as some examples, scheduled remote start, vehicle finder, gas or charge level indications, and/or tire pressure indications via a user's mobile device 116. To access the services of the SDN 132, the service mode 130 of the TCU 108 may be required to be set to "eCall Plus," not to "eCall Only."

FIG. 2 illustrates an example portion of a flowchart for the operation of the TCU 108. Referring to element 202, by default, the service mode 130 for all TCUs 108 may be set to an extended service mode 130, e.g., "eCall Plus." As shown at element 204, this may be accomplished, for example, by the following information in the elementary file: USIM Service Table (EFust) fields, service 89 (eCall Data), service 2 (Fixed Dialing Number) and service 4 (Service Dialing Number) to 1, and setting the elementary file: Enabled Service Table (EFest), service 1 (Fixed Dialing Number) field to 0. These values may be set as shown at element 206.

At 208, the TCU 108 implements, at an application layer, a periodic check of the SIM configuration status (EFust & EFest) while the power mode is FPO (Full Power On), or FPS (Full Power Standby), to detect any change of the service mode 130 of the SIM. This check may be performed periodically, e.g., every 30 seconds in one example.

At operations 210, 212, and 214, the TCU 108 identifies the values of SIM configuration status (EFust & EFest). More specifically, at element 210 if EFust is equal to 1 and EFest is equal to 0, then the TCU 108 moves to element 216 to remain in "eCall Plus" mode. Processing may return to operation 208 at the next periodic check of the SIM. At operation 212, if EFust is equal to 0 and EFest is equal to 0, then the TCU 108 moves to element 218 to transition to "eCall Capable" mode. Similar to after operation 216, processing may return to operation 208 at the next periodic check of the SIM.

Figure 3:
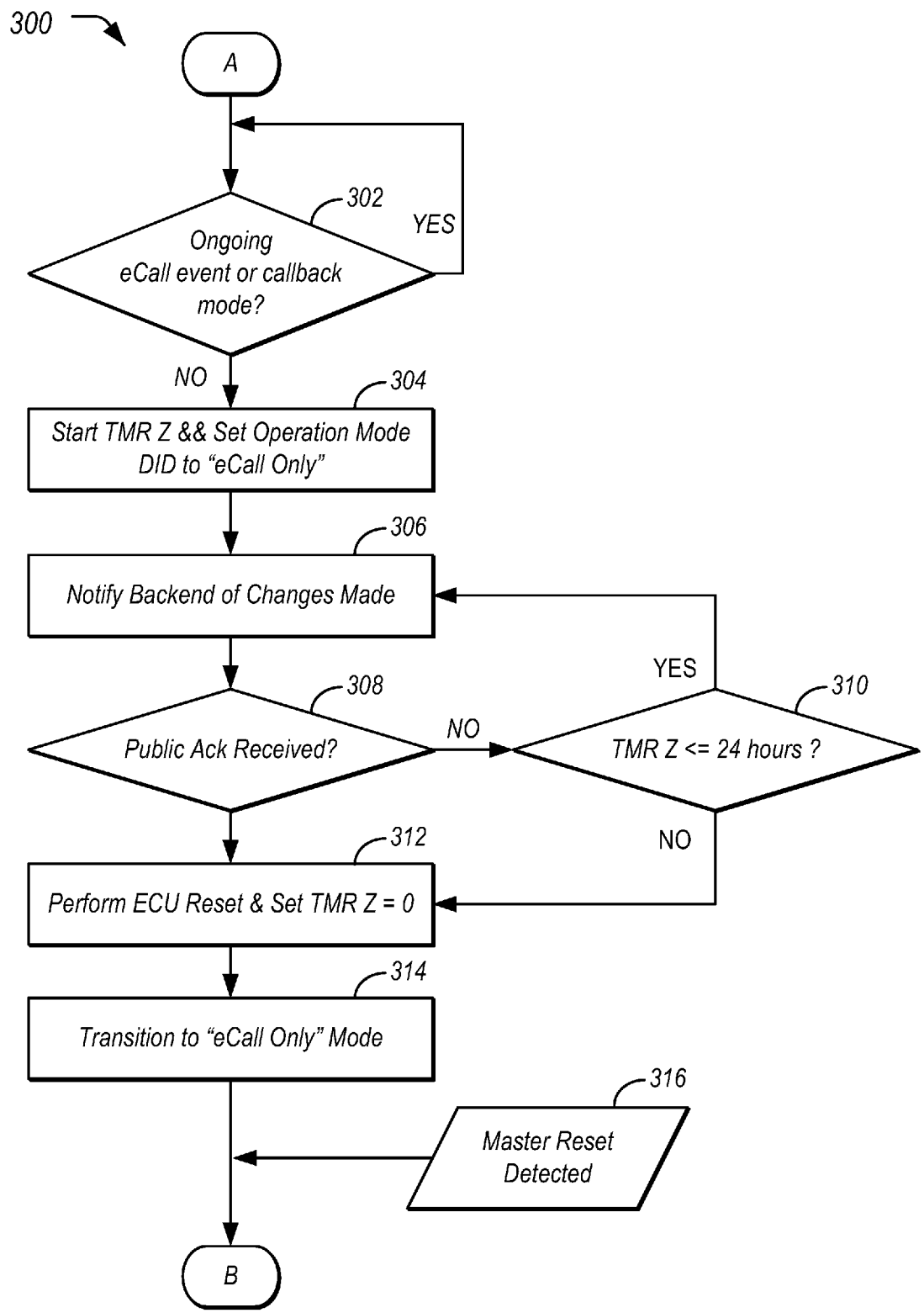
FIG. 3 illustrates an additional example portion of a process for performing "eCall Plus" to "eCall Only" transitioning and recovery.
Figure 4:
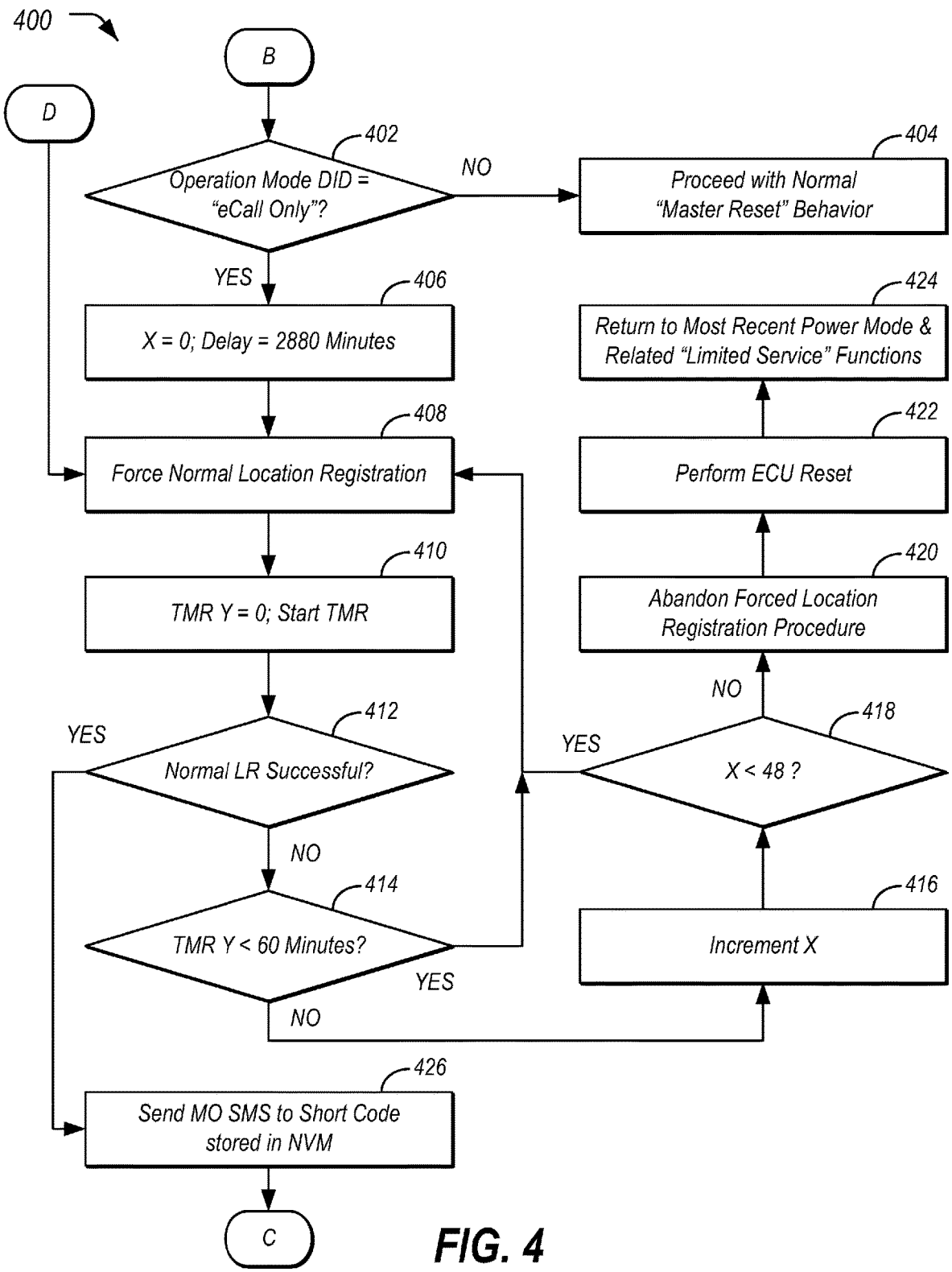
FIG. 4 illustrates an additional example portion of a process for performing "eCall Plus" to "eCall Only" transitioning and recovery.

However, at operation 214, if EFust is equal to 1 and EFest is equal to 0, then the TCU 108 moves to element 302 of FIG. 3. This condition may indicate a transition to "eCall Only" mode. This transition may occur due to various conditions. For instance, per customer's request, or due to a security concern, a system operator may elect to disable all telematics and infotainment features, while only keeping emergency services available. In one example, to do so the operator may use an API call to request the MNO (Mobile Network Operator) to accordingly configure the SIM (Subscriber Identity Module) over the air. At element 302, the TCU 108 may loop until completion of a current eCall event or callback mode.

Continuing at operation 304, responsive to the TCU 108 eCall logic 128 application detecting that the SIM service mode 130 of the SIM has changed from "eCall Plus" to "eCall only," the eCall logic 128 starts a timer (e.g., a 24 hour timer), and sets the "operation mode" 130 data identifier in the NVM (non-volatile memory) to "eCall only." At operation 306, TCU 108 eCall logic 128 sends an alert to the SDN 132 notifying it of the change.

At operation 308 the TCU 108 waits for acknowledgement from the SDN 132 of the change. In an example, if the acknowledgement is not received, control passes to operation 310 to identify whether the timer Z set at operation 304 is expired. If no, control returns to operation 306. If so, or if the acknowledgement was received at operation 310, control passes to operation 312.

As shown at operation 312, responsive to receipt of an acknowledgement from the SDN 132 of receipt of the alert, the eCall logic 128 may be programmed to cause the TCU 108 to stop and reset the 24 hour timer, disconnect from the SDN 132, detach from the cellular network 104, and enter a dormant state where only emergency services are allowed. Accordingly, at operation 314 the TCU 108 transitions to "eCall Only" mode.

When the customer wants to re-enable the telematics and infotainment services, the SDN 132 may utilize an API call to request the MNO (Mobile Network Operator) to reconfigure the SIM over the air accordingly. The MNO may be configured to queue the OTA update waiting for the TCU 108 to show POT (Proof of Traffic). The SDN 132, in parallel, may be configured to instruct the customer to perform "Master Reset" from the vehicle's HMI (Human Machine Interface). As shown at operation 316, responsive to the eCall logic 128 detecting a "Master Reset" event, control passes to operation 402 of FIG. 4.

At operation 402, if the Operation Mode DID is not set to "eCall Only," control passes to operation 404 to proceed with normal "Master Reset" behavior at operation 404. If, however, the Operation Mode DID is set to "eCall Only," control passes to operation 406. At the beginning of a duration, as shown at operation 406, the eCall logic 128 may be programmed to reset a counter X, and set a "Delay" integer parameter to the value Z (default value of Z is 2880 minutes).

At operation 408, the eCall logic 128 ignores the SIM service mode 130, and force Location Registration to the cellular network circuit switching domain for a configurable amount of time (an example default value of duration of forced registration is 48 hours) to allow the MNO to reconfigure the SIM over the air.

At operation 410, the eCall logic 128 of the TCU 108 resets and starts a timer Y. Accordingly, the eCall logic 128 provides an algorithm that guarantees a precise duration of forced registration.

At operation 412, the eCall logic 128 determines whether the normal location registration was successful. If not, and the network registration was lost while the TCU 108 is in the forced registration period, control passes to operation 414. At 414, the TCU 108 confirms that the Y timer is less than 60 minutes. If not and the location registration procedure fails, the eCall logic 128 may be further programmed to try again, e.g., at the top of the next hour, and increase counter X by 1 at operation 416. Notably, if the location registration failed due to a network reject, the TCU 108 may follow the corresponding 3GPP behavior. Even if the reject cause does not allow a reattempt, the TCU 108 will still force another location request at the top of the next hour.

At operation 418, the TCU 108 determines whether X=>48, and no successful location registration has been made. If so, at operation 420, the eCall logic 128 may be programmed to abandon the procedure, perform a reset at operation 422, and return to the service mode 130 defined by the SIM as shown at operation 424. If not, from operation 418 control passes back to operation 408.

Responsive to successful completion of the location registration procedure from operation 412, the eCall logic 128 may be programmed to trigger a MO (Mobile Originated) SMS to a short code stored initialization NVM (non-volatile memory). In an example, the MO SMS may be a text message that contains the characters "F O R D." This MO SMS may accordingly serve as POT (Proof Of Traffic), which will trigger, and allow the reception of, the MNO-queued SIM OTA update. As opposed to other systems, the improved eCall logic 128 implementation of the mobile originated SMS may save the cost of deploying and maintaining a reconfiguration server, and may also simplify the design and eliminate possible points of failure.

Figure 5:
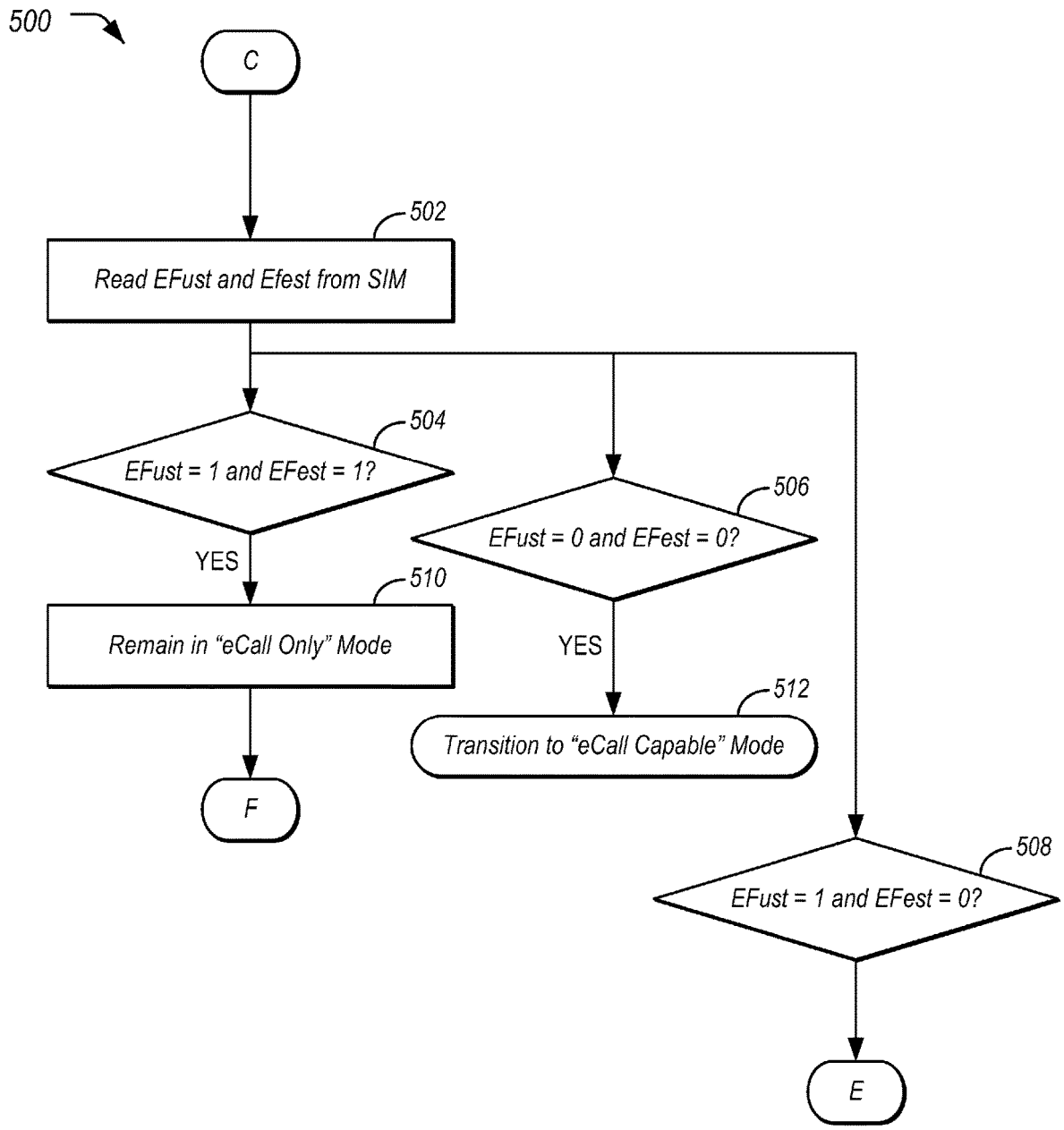
FIG. 5 illustrates an additional example portion of a process for performing "eCall Plus" to "eCall Only" transitioning and recovery.

After operation 426, control passes to operation 502 of FIG. 5. During the "forced registration" period, the eCall logic 128 may be programmed to periodically check the service mode 130 configuration of the SIM at 502.

At operations 504, 506, and 508, the TCU 108 identifies the values of SIM configuration status (EFust & EFest). More specifically, at element 504 if EFust is equal to 1 and EFest is equal to 0, then the TCU 108 moves to element 510 to remain in "eCall Plus" mode. After operation 510, control passes to operation 702 of FIG. 7, as discussed in detail below.

At operation 506, if EFust is equal to 0 and EFest is equal to 0, then the TCU 108 moves to element 512 to transition to "eCall capable" mode. After operation 506, processing may return to operation 502 at the next periodic check of the SIM.

Figure 6:
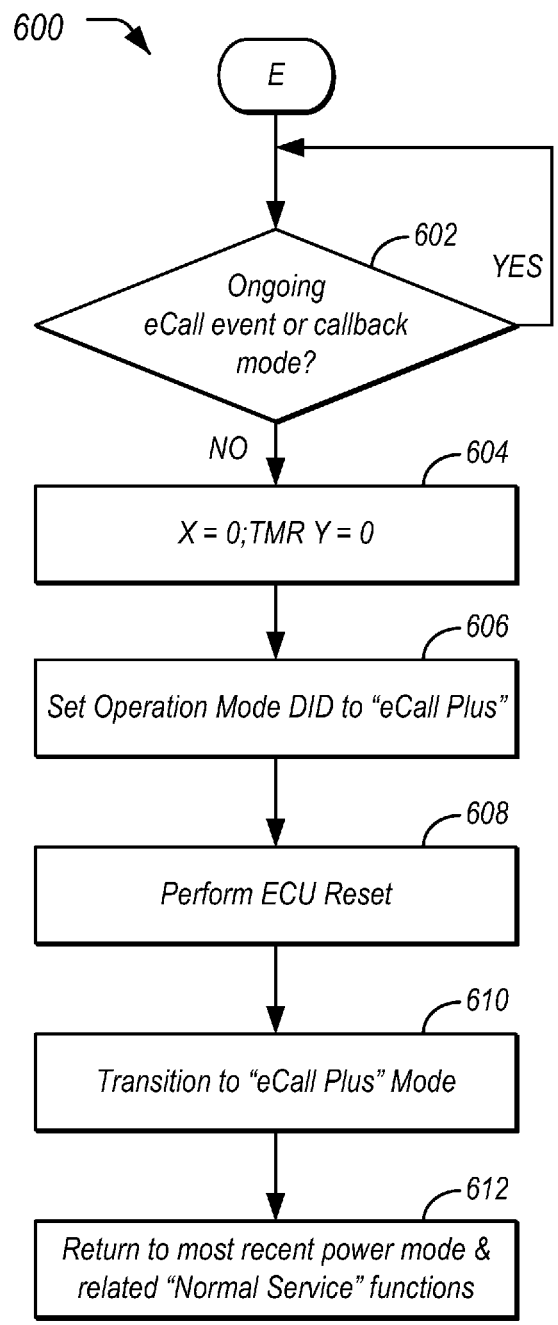
FIG. 6 illustrates an additional example portion of a process for performing "eCall Plus" to "eCall Only" transitioning and recovery.
Figure 7:
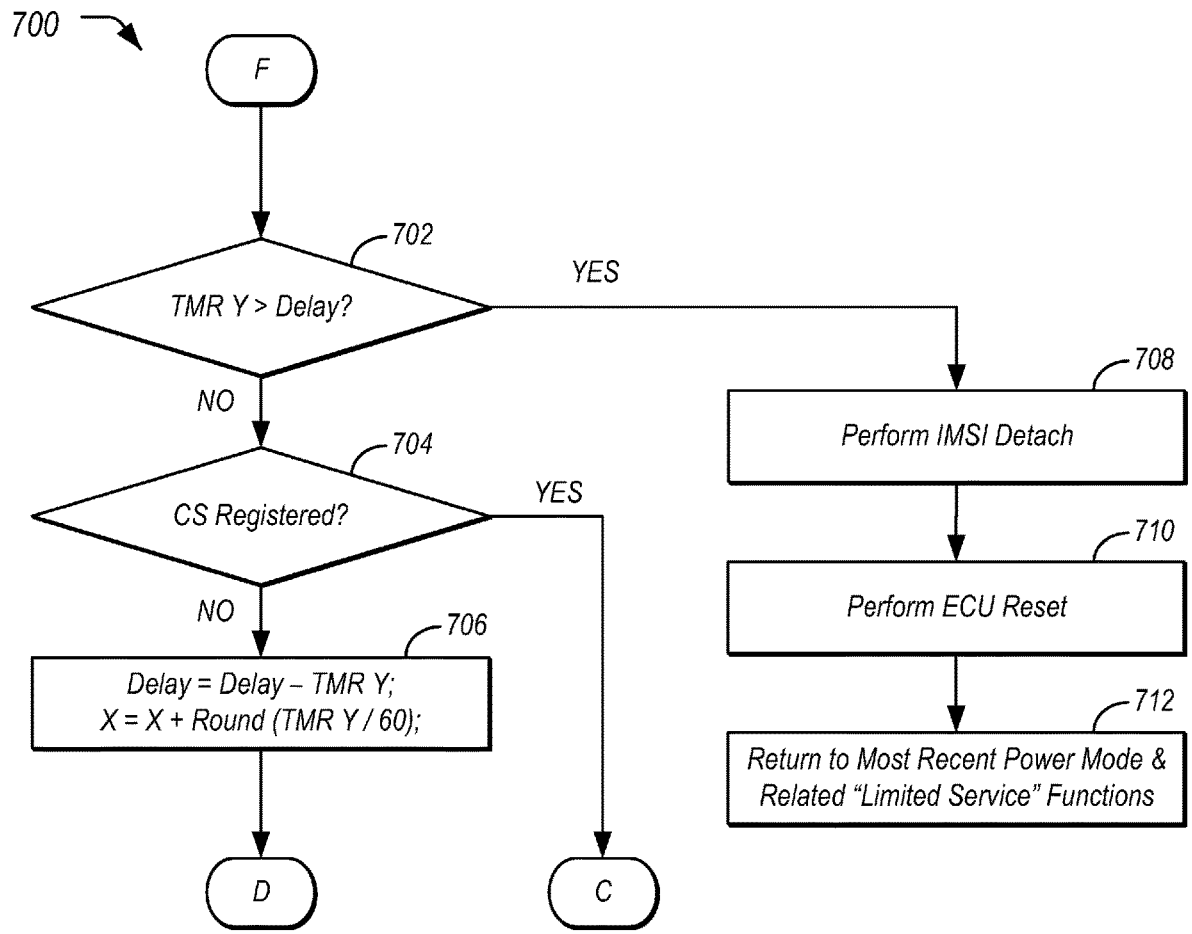
FIG. 7 illustrates an additional example portion of a process for performing "eCall Plus" to "eCall Only" transitioning and recovery.

At operation 508, if EFust is equal to 1 and EFest is equal to 0, responsive to the detection by the eCall logic 128 that the service mode 130 has changed from "eCall Only" to "eCall Plus," control passes to operation 602 of FIG. 6. At 602, the TCU 108 may loop until completion of a current eCall event or active callback mode. If the eCall logic 128 detects a change in the SIM service mode 130 while there is an ongoing eCall event, or while it is in active "Call Back" mode, the eCall logic 128 may be programmed to postpone all corresponding actions until the event concludes and the "Call Back" timer expires so that no interruption to the eCall event occurs.

Next, at operation 604, the TCU 108 resets X and the timer Y to zero. At operation 606, the eCall logic 128 may be programmed to set the DID operation mode to "eCall Plus," perform a reset at operation 608, and transition to "eCall Plus" mode at operation 610 to re-enable telematics and infotainment features. As indicated at operation 612, the TCU 108 may return to the most recent power mode and related normal services function.

At operation 702, proceeding from operation 510 of FIG. 5, if the Y timer is not greater than the Delay, control passes to operation 704. If not, control passes to operation 708. At operation 704, the TCU 108 determines whether the TCU 108 is registered for circuit switching. If so, control passes to operation 502 of FIG. 5 as discussed above. If not, control passes to operation 706. At operation 706 the eCall logic 128 may be programmed to set the counter X to "X+Round (TMR Y/60)" and set the "Delay" parameter to "Delay—TMR Y." After operation 706, control may pass to operation 408 of FIG. 4 to attempt to recover registration to the network's circuit switching domain and maintain it for the remainder of the "forced registration" period.

At operation 708, proceeding from operation 702 in the event the Y timer exceeds the delay, as the "forced registration" period has expired without detecting a SIM service mode 130 configuration change, the eCall logic 128 may be programmed to terminate all related running application threads, perform IMSI (International Mobile Subscriber Identity) detach at operation 708, perform a reset at operation 710, and return the last known service and power mode at operation 712.

Thus, by use of the eCall logic 128 to control the service mode 130 of the TCU 108, the TCU 108 may gain the capability to disable the telematics infotainment services due to request from customers with privacy concerns (e.g., customers that do not consent to share their location information), while keeping emergency services active to meet the legal requirements in some markets (e.g., Europe). As described above, the TCU 108 provides a mechanism to disable nonemergency services, therefore stopping communication between the customer's vehicle and the cellular network except for communications required for emergency calls. Additionally, the TCU 108 provides a recovery path to re-enable the telematics and infotainment services if required, overcoming the challenge that the TCU 108 is not reachable OTA in prior implementations.

Computing devices described herein, such as the telematics controller 108, generally include computer-executable instructions where the instructions may be executable by one or more computing devices such as those listed above. Computer-executable instructions, such as those of the eCall logic 128, may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a telematics controller, programmed to
      responsive to detecting transition from eCall Plus mode to eCall Only mode, and to acknowledgement from a service delivery network (SDN) of an alert of the transition sent to the SDN by the controller, reattach to a network in eCall Only mode; and
      responsive to transition from eCall Only mode to eCall Plus mode, reattach to the network in eCall Plus mode.

2. The vehicle of claim 1, wherein the telematics controller is further programmed to, when performing the transition from eCall Only mode to eCall Plus mode, perform location registration.

3. The vehicle of claim 2, wherein the telematics controller is further programmed to, responsive to successful completion of the location registration, trigger a mobile originated (MO) short message service (SMS) message to serve as proof of traffic (POT) to trigger and allow receipt of an over-the-air update.

4. The vehicle of claim 1, wherein the telematics controller is further programmed to periodically identify values of a subscriber identity module (SIM) of the telematics controller to identify a change of service mode from eCall Plus mode to eCall Only mode or from eCall Only mode to eCall Plus mode.

5. The vehicle of claim 1, wherein the transition from eCall Plus mode to eCall Only mode is triggered responsive to a denial of consent to share location information from the vehicle.

6. The vehicle of claim 1, wherein the transition from eCall Plus mode to eCall Only mode is triggered responsive to a security concern.

7. A method comprising:
   periodically identifying values of a subscriber identity module (SIM) of a telematics controller to identify a change of service mode; and
   responsive to a detected transition of the service mode from eCall Plus mode to eCall Only mode, and to acknowledgement from a service delivery network (SDN) of an alert of the transition sent to the SDN by the controller, reattaching the controller to a network in eCall Only mode.

8. The method of claim 7, further comprising, responsive to a detected transition from eCall Only mode to eCall Plus mode, reattaching to the network in eCall Plus mode including performing location registration.

9. The method of claim 8, further comprising responsive to successful completion of the location registration, triggering a mobile originated (MO) short message service (SMS) message to serve as proof of traffic (POT) to trigger and allow receipt of an over-the-air update to the values of the SIM to eCall Plus mode.

10. The method of claim 7, further comprising triggering the transition from eCall Only mode to eCall Plus mode responsive to performance of a master reset to the telematics controller.

11. The method of claim 7, further comprising triggering the transition from eCall Plus mode to eCall Only mode responsive to a denial of consent to share location information.

12. The method of claim 7, further comprising triggering the transition from eCall Plus mode to eCall Only mode responsive to a security concern.

13. A non-transitory computer-readable medium comprising instructions that, when executed by a processor of a telematics controller of a vehicle, cause the controller to:
periodically identify values of a subscriber identity module (SIM) of the telematics controller to identify a change of service mode;
responsive to a detected transition of the service mode from an eCall Plus mode to an eCall Only mode, and to acknowledgement from a service delivery network (SDN) of an alert of the transition sent to the SDN by the vehicle, reattach to a network in eCall Only mode; and
responsive to a detected transition from eCall Only mode to eCall Plus mode, reattaching to the network in eCall Plus mode.

14. The medium of claim 13, further comprising instructions that, when executed by a processor of the telematics controller, cause the controller to trigger a mobile originated (MO) short message service (SMS) message to serve as proof of traffic (POT) to trigger and allow receipt of an over-the-air update to the values of the SIM to eCall Plus mode.

15. The medium of claim 13, further comprising instructions that, when executed by a processor of the telematics controller, cause the controller to trigger the transition from eCall Only mode to eCall Plus mode responsive to performance of a master reset to a telematics controller of the vehicle.

16. The medium of claim 13, further comprising instructions that, when executed by a processor of the telematics controller, cause the controller to trigger the transition from eCall Plus mode to eCall Only mode responsive to a denial of consent to share location information from the vehicle.

17. The medium of claim 13, further comprising instructions that, when executed by a processor of the telematics controller, cause the controller to trigger the transition from eCall Plus mode to eCall Only mode responsive to a security concern.

* * * * *